US008422888B2

(12) United States Patent
Uekama

(10) Patent No.: US 8,422,888 B2
(45) Date of Patent: Apr. 16, 2013

(54) OPTICAL TRANSMISSION SYSTEM

(75) Inventor: Kimio Uekama, Kanagawa (JP)

(73) Assignee: Fujitsu Telecom Networks Limited, Kanagawa (JP)

( * ) Notice: Subject to any disclaimer, the term of this patent is extended or adjusted under 35 U.S.C. 154(b) by 277 days.

(21) Appl. No.: 12/843,753

(22) Filed: Jul. 26, 2010

(65) Prior Publication Data

US 2011/0103804 A1 May 5, 2011

(30) Foreign Application Priority Data

Nov. 2, 2009 (JP) ................................. 2009-252019

(51) Int. Cl.
 *H04B 10/12* (2006.01)
(52) U.S. Cl.
 USPC ......................................... 398/159; 398/147
(58) Field of Classification Search .................. 398/147, 398/158, 159
 See application file for complete search history.

(56) References Cited

U.S. PATENT DOCUMENTS

2006/0193637 A1* 8/2006 Mattheus et al. ............. 398/147
2010/0247095 A1* 9/2010 Fujita et al. .................. 398/29

FOREIGN PATENT DOCUMENTS

| JP | 2002-208892 | 7/2002 |
| JP | 2003-121303 | 4/2003 |
| JP | 2006-196938 | 7/2006 |
| JP | 2009-147416 | 7/2009 |
| WO | WO2008/053567 | 5/2008 |
| WO | WO 2009/081449 | * 7/2009 |

OTHER PUBLICATIONS

Office Action issued for related JP App. No. 2009-252019 dated Feb. 7, 2012 and its English translation.
Office Action issued for related JP App. No. 2009-252019 dated Jul. 17, 2012 and its English translation.

* cited by examiner

*Primary Examiner* — Nathan Curs
(74) *Attorney, Agent, or Firm* — Ladas & Parry, LLP

(57) ABSTRACT

An optical transmission system is provided with an optical transmission apparatus, an optical reception apparatus, an optical transmission line redundantly configured with an active system optical transmission line and an standby system optical transmission line, an optical switch that switches an optical transmission line between the active system optical transmission line and the standby system optical transmission line, a variable dispersion compensator placed between the optical switch and the optical reception apparatus, a dispersion amount measuring unit that measures the dispersion amount of the standby system optical transmission line when the active system optical transmission line is being selected by the optical switch, a dispersion compensation amount setting unit that sets the amount of dispersion compensation to be applied to the standby system optical transmission line based on the measured dispersion amount of the standby system optical transmission line, and a control unit that controls, when the optical transmission line is switched from the active system optical transmission line to the standby system optical transmission line by the optical switch, the variable dispersion compensator so that the amount of dispersion compensation becomes the set amount of dispersion compensation.

8 Claims, 9 Drawing Sheets

OPTICAL TRANSMISSION SYSTEM

CROSS-REFERENCE TO RELATED APPLICATIONS

This application claims priority to Japanese Patent Application No. 2009-252019 filed on Nov. 2, 2009, the disclosure of which is incorporated herein by reference in its entirety.

BACKGROUND OF THE INVENTION

1. Field of the Invention

The present invention relates to an optical transmission system that transmits and receives an optical signal via an optical transmission line and particularly to an optical transmission system having an optical transmission path redundantly configured with an active system optical transmission line and a standby system optical transmission line.

2. Description of the Related Art

In recent years, with the growing use of the Internet, the introduction and development of a wavelength division multiplexing (WDM) optical transmission system have been made in which the system transmits optical signals having different wavelengths all at once to a single optical fiber. Currently the transmission speed per a wavelength is mostly from 2.4 Gbps to 10 Gbps. However, in order to meet the increasing demand for information transmission, a higher transmission speed of, for example, 40 Gbps is beginning to be adopted.

In a WDM optical transmission system, a time slot for one bit becomes shorter and the band of wavelengths of a modulating signal spectrum becomes larger when the transmission speed per a wavelength becomes faster. Thus, intersymbol interference is produced by a waveform distortion (pulse broadening), which becomes a factor for limiting a transmission distance.

Thus, a technique for performing dispersion compensation to wavelength dispersion accumulated by an optical fiber transmission line inside a relay amplification node is important. A technique of adjusting the entire amount of wavelength dispersion to be zero by using a dispersion compensating fiber (DCF) having an inversed amount of wavelength dispersion of an optical fiber is used.

With a conventional signal speed of at most 10 Gbps, optical signals can be received by performing dispersion compensation all at once by using a dispersion compensating optical fiber (DCF) on the optical signals multiplexed with wavelengths by a wavelength division multiplexing apparatus. However, raising the transmission speed to 40 Gbps extremely narrows down the range of dispersion tolerance of a light receiver. For example, the dispersion tolerance is approximately ±11600 ps/nm when the transmission speed is 2.4 Gbps and is approximately ±800 ps/nm when the transmission speed is 10 Gbps. When the transmission speed is 40 Gbps, the dispersion tolerance is extremely small, being approximately ±80 ps/nm. For this reason, in addition to performing dispersion compensation on wavelength-multiplexed signals all at once, it is necessary to perform dispersion compensation individually on each wavelength-divided optical signal by using a variable dispersion compensator (VDC) in the case where the transmission speed is at least 40 Gbps.

As the control method of a variable dispersion compensator, a method is known to measure the bit error rate of a received optical signal and to set the dispersion compensation value of a variable dispersion compensator so that the bit error rate becomes the smallest (for example, see patent document 1). It requires, for example, at least a few minutes to search the dispersion compensation value at which the bit error rate becomes the smallest when setting the dispersion compensation value based on the bit error rate.

[Patent document No. 1] JP 2002-208892

In wavelength division multiplexing optical transmission systems, lines are normally relieved, in case of trouble, by transmitting optical signals by using optical transmission lines redundantly configured with active system optical transmission lines and standby system optical transmission lines. More specifically, optical transmission systems are configured in such a manner that standby system optical transmission lines are used, in case of some trouble with currently-operated active system optical transmission lines.

A dispersion compensation method using dispersion compensating fibers is employed in wavelength division multiplexing optical transmission systems where the transmission speed is 2.4 Gbps or 10 Gbps. Thus, an individual adjustment of the amount of dispersion compensation for each wavelength is not required, allowing for high-speed switching from active system optical transmission lines to standby system optical transmission lines.

On the other hand, a dispersion compensation method using variable dispersion compensators in addition to dispersion compensating fibers is employed in wavelength division multiplexing optical transmission systems where the transmission speed is at least 40 Gbps. However, the bit error rates of optical signals that have passed through standby system optical transmission lines cannot be measured during the transmission and reception of the optical signals by using active system optical transmission lines. Therefore, optical transmission line switching requires time since, in the event a failure occurs in the active system optical transmission lines, the variable dispersion compensators must be readjusted while bit error rates are being measured after the optical transmission lines are switched to standby system optical transmission lines.

SUMMARY OF THE INVENTION

In this background, a purpose of the present invention is to provide an optical transmission system capable of reducing time for redundancy switching, the optical transmission system having an optical transmission line redundantly configured with an active system optical transmission line and a standby system optical transmission line.

An optical transmission system according to one embodiment of the present invention comprises: an optical transmission apparatus operative to transmit an optical main signal; an optical reception apparatus operative to receive the optical main signal; an optical transmission line that is placed between the optical transmission apparatus and the optical reception apparatus and is redundantly configured with an active system optical transmission line and a standby system optical transmission line and; an optical switch operative to switch an optical transmission line between the active system optical transmission line and the standby system optical transmission line; a variable dispersion compensator placed between the optical switch and the optical reception apparatus; a dispersion amount measuring unit operative to measure the dispersion amount of the standby system optical transmission line when the active system optical transmission line is being selected by the optical switch; a dispersion compensation amount setting unit operative to set the amount of dispersion compensation to be applied to the standby system optical transmission line based on the measured dispersion amount of the standby system optical transmission line; and a control unit operative, when the optical transmission line is switched from the active system optical transmission line to the standby system optical transmission line by the optical switch, to control the variable dispersion compensator so that the amount of dispersion compensation becomes the set amount of dispersion compensation.

According to the present embodiment, since the amount of dispersion compensation to be applied to a standby system optical transmission line is set when an active system optical transmission line is being operated, the variable dispersion compensator can be promptly controlled so that the amount of dispersion compensation becomes the proper amount of dispersion compensation to the standby system optical transmission line when the optical transmission line is switched from the active system optical transmission line to the standby system optical transmission line. This allows for an optical main signal to be communicated right after the switching of the optical transmission line, and the time for redundancy switching can thus be reduced.

Another embodiment of the present invention also relates to an optical transmission system. The optical transmission system comprises: an optical transmission apparatus operative to transmit an optical main signal; an optical reception apparatus operative to receive the optical main signal; an optical transmission line that is placed between the optical transmission apparatus and the optical reception apparatus and is redundantly configured with an active system optical transmission line and a standby system optical transmission line; variable dispersion compensators placed on the active system optical transmission line and the standby system optical transmission line, respectively; an optical switch, which is placed between the variable dispersion compensator and the optical reception apparatus, operative to switch an optical transmission line between the active system optical transmission line and the standby system optical transmission line; a dispersion amount measuring unit operative to measure the dispersion amount of the standby system optical transmission line when the active system optical transmission line is being selected by the optical switch; a dispersion compensation amount setting unit operative to set the amount of dispersion compensation to be applied to the standby system optical transmission line based on the measured dispersion amount of the standby system optical transmission line; and a control unit operative to control a variable dispersion compensator of the standby system optical transmission line so that the amount of dispersion compensation becomes the set amount of dispersion compensation.

According to the present embodiment, when the active system optical transmission line is being operated, the amount of dispersion compensation to be applied to the standby system optical transmission line is set, and the variable dispersion compensator of the standby system optical transmission line is controlled so that the amount of dispersion compensation becomes the set amount of dispersion compensation. This allows for an optical signal to be communicated right after the switching of the optical transmission line from the active system optical transmission line to the standby system optical transmission line, and the time for redundancy switching can thus be reduced.

Optional combinations of the aforementioned constituent elements, or implementations of the invention in the form of apparatuses, methods, systems, programs, and recording mediums storing programs may also be practiced as additional modes of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
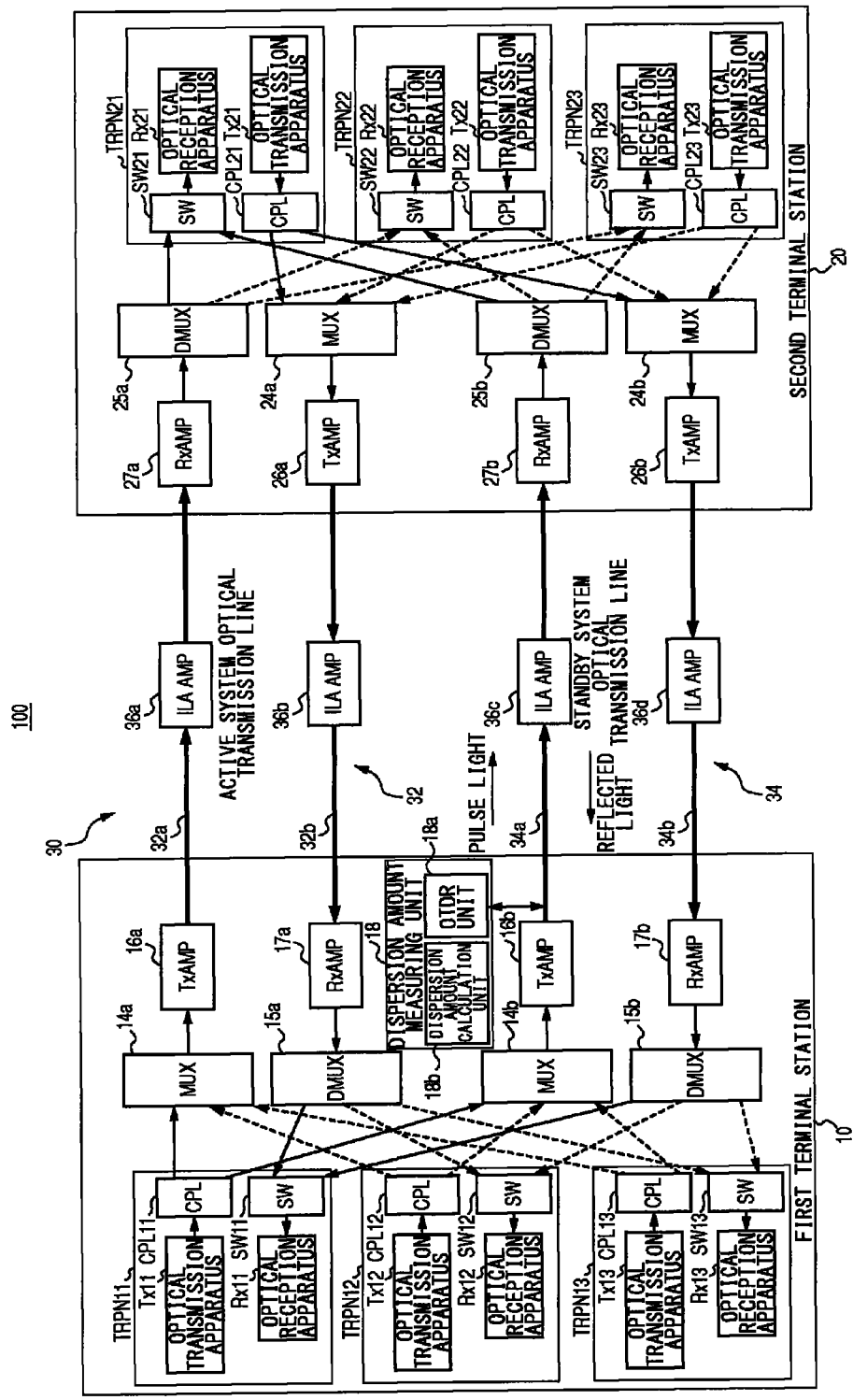
FIG. 1 is a diagram illustrating the configuration of an optical transmission system according to an embodiment of the present invention.

FIG. 1 is a diagram illustrating the configuration of an optical transmission system 100 according to an embodiment of the present invention. The optical transmission system 100 shown in FIG. 1 is provided with a first terminal station 10, a second terminal station 20, and an optical transmission line 30 provided between the first terminal station 10 and the second terminal station 20. The optical transmission system 100 is a point-to-point WDM optical transmission system that multiplexes and transmits, between the first terminal station 10 and the second termination station 20 via the optical transmission line, optical main signals having different wavelengths.

The first terminal station 10 is provided with a first transponder TRPN 11 through a third transponder TRPN 13. The number of transponders is not limited to three. The first transponder TRPN 11 through the third transponder TRPN 13 are respectively provided with optical transmission apparatuses Tx11-Tx13, optical reception apparatuses Rx11-Rx13, couplers CPL11-CPL13, and optical switches SW11-SW13. The first terminal station 10 is provided with: a first multiplexer 14a and a second multiplexer 14b, both connected with the couplers CPL11-CPL13; a first demultiplexer 15a and a second demultiplexer 15b, both connected to the optical switches SW11-SW13; a first transmission amplifier 16a connected with the first multiplexer 14a; a second transmission amplifier 16b connected with the second multiplexer 14b; a first reception amplifier 17a connected with the first demultiplexer 15a and a second reception amplifier 17b connected with the second demultiplexer 15b.

The second terminal station 20 is provided with a first transponder TRPN 21 through a third transponder TRPN 23. The first transponder TRPN 21 through the third transponder TRPN 23 are respectively provided with optical transmission apparatuses Tx21-Tx23, optical reception apparatuses Rx21-Rx23, couplers CPL21-CPL23, and optical switches SW21-

SW23. The second terminal station 20 is provided with: a first multiplexer 24a and a second multiplexer 24b, both connected with the couplers CPL21-CPL23; a first demultiplexer 25a and a second demultiplexer 25b, both connected to the optical switches SW21-SW23; a first transmission amplifier 26a connected with the first multiplexer 24a; a second transmission amplifier 26b connected with the second multiplexer 24b; a first reception amplifier 27a connected with the first demultiplexer 25a; and a second reception amplifier 27b connected with the second demultiplexer 25b.

The optical transmission line 30 is provided with an active system optical transmission line 32, a standby system optical transmission line 34, and inline amplifiers 36a-36d.

The active system optical transmission line 32 includes an active system first optical fiber 32a that transmits an optical main signal to be transmitted from the first terminal station 10 to the second terminal station 20 and an active system second optical fiber 32b that transmits an optical main signal to be transmitted from the second terminal station 20 to the first terminal station 10. The active system first optical fiber 32a is placed between the first transmission amplifier 16a of the first termination station 10 and the first reception amplifier 27a of the second terminal station 20, and the inline amplifier 36a is placed in the middle thereof. The active system second optical fiber 32b is placed between the first reception amplifier 17a of the first termination station 10 and the first transmission amplifier 26a of the second terminal station 20, and the inline amplifier 36b is placed in the middle thereof.

The standby system optical transmission line 34 includes a standby system first optical fiber 34a that transmits an optical main signal to be transmitted from the first terminal station 10 to the second terminal station 20 and a standby system second optical fiber 34b that transmits an optical main signal to be transmitted from the second terminal station 20 to the first terminal station 10. The standby system first optical fiber 34a is placed between the second transmission amplifier 16b of the first termination station 10 and the second reception amplifier 27b of the second terminal station 20, and the inline amplifier 36c is placed in the middle thereof. The standby system second optical fiber 34b is placed between the second reception amplifier 17b of the first termination station 10 and the second transmission amplifier 26b of the second terminal station 20, and the inline amplifier 36d is placed in the middle thereof.

As described above, the optical transmission system 100 has an optical transmission line redundantly configured with the active system optical transmission line 32 and the standby system optical transmission line 34.

In order to compensate for the wavelength dispersion of the optical transmission line, dispersion compensating fibers (not shown) are provided to each transmission amplifier, reception amplifier, and inline amplifier.

Furthermore, the first terminal station 10 is provided with a dispersion amount measuring unit 18 that measures the dispersion amount of the standby system optical transmission line 34 in the embodiment. Details of the dispersion amount measuring unit 18 will be described later.

The operation of the optical transmission system 100 is now described. In the respective transponders of the first terminal station 10, the optical transmission apparatuses Tx11-Tx13 output optical main signals. In the embodiment, the optical main signals output from the optical transmission apparatuses Tx11-Tx13 are, for example, optical main signals having a high transmission speed of 40 Gbps or the like. The optical main signals output from the optical transmission apparatuses Tx11-Tx13 are each branched into two signals by the couplers CPL11-CPL13, respectively. The first multiplexer 14a imports one of the branched optical main signals and carries out multiplexing, and the second multiplexer 14b imports the other one of the branched optical main signals and carries out multiplexing.

The optical main signal multiplexed by the first multiplexer 14a (hereinafter, also referred to as an active system WDM optical main signal) enters the active system first optical fiber 32a after being amplified by the first transmission amplifier 16a. The active system WDM optical main signal passing inside the active system first optical fiber 32a enters the first reception amplifier 27a of the second terminal station 20 after being amplified by the inline amplifier 36a. After being amplified by the first reception amplifier 27a, the active system WDM optical main signal is demultiplexed by the first demultiplexer 25a, and the demultiplexed optical main signals respectively enter the optical switches SW21-SW23 of the first transponder TRPN 21 through the third transponder TRPN 23.

On the other hand, the optical main signal multiplexed by the second multiplexer 14b (hereinafter, also referred to as a standby system WDM optical main signal) enters the standby system first optical fiber 34a after being amplified by the second transmission amplifier 16b. The standby system WDM optical main signal passing inside the standby system first optical fiber 34a enters the second reception amplifier 27b of the second terminal station 20 after being amplified by the inline amplifier 36c. After being amplified by the second reception amplifier 27b, the standby system WDM optical main signal is demultiplexed by the second demultiplexer 25b, and the demultiplexed optical main signals respectively enter the optical switches SW21-SW23 of the first transponder TRPN 21 through the third transponder TRPN 23.

The optical switches SW21-SW23 each select either the optical main signal that has passed through the active system first optical fiber 32a or the optical main signal that has passed through the standby system first optical fiber 34a. The optical main signals selected by the optical switches SW21-SW23 are respectively received by the optical reception apparatuses Rx21-Rx23, and predetermined signal processes such as photoelectric conversion, timing extraction, identification and reproduction, and error correction are then performed on the optical main signals.

Similar processes as those described above are performed on the optical main signals transmitted from the optical transmission apparatuses Tx21-Tx23 of the second terminal station 20 to the optical reception apparatuses Rx11-Rx13 of the first terminal station 10 via the active system second optical fiber 32b and the standby system second optical fiber 34b. Therefore, a detailed description will be made in the following mainly regarding the situation when an optical main signal is transmitted from the first terminal station 10 to the second terminal station 20.

Under the normal status of operation, the optical switches SW21-SW23 select the active system first optical fiber 32a. In the event of some failure in the active system first optical fiber 32a, the optical switches SW21-SW23 switch the optical transmission line from the active system first optical fiber 32a to the standby system first optical fiber 34a. As described above, the optical transmission line redundantly configured with the active system first optical fiber 32a and the standby system first optical fiber 34a allows the optical transmission system 100 to solve an optical transmission line failure.

As described above, in the case where the transmission speed is at least 40 Gbps, a single dispersion compensation of the wavelength-multiplexed optical main signal using dispersion compensating fibers provided to transmission amplifiers, reception amplifiers, inline amplifiers, and the like is not sufficient, and it is necessary to perform dispersion compensation individually on each wavelength-divided optical main signal by using a variable dispersion compensator. Variable dispersion compensators are placed, for example, between the optical switches SW21-SW23 and the optical reception apparatuses Rx21-Rx23 (not shown in FIG. 1).

A variable dispersion compensator normally measures the bit error rate of a received optical signal and sets the dispersion compensation value of the variable dispersion compensator so that the bit error rate is at a minimum. In this case, it requires at least a few minutes to search the dispersion compensation value at which the bit error rate becomes the smallest.

Under a normal status of operation, when the active system first optical fiber 32a is selected by the optical switches SW21-SW23, the optical main signals that have passed through the standby system first optical fiber 34a are not input into the optical reception apparatuses Rx21-Rx23. Therefore, when an optical main signal that has passed through the active system first optical fiber 32a is being communicated, the bit error rate of an optical main signal that has passed the standby system first optical fiber 34a cannot be measured. Therefore, in the event of a failure in the active system first optical fiber 32a, the variable dispersion compensator must be readjusted while measuring the bit error rate after switching the optical transmission line to the standby system first optical fiber 34a. Thus, there is a possible that the time for redundancy switching becomes longer. Even in the case of a point-to-point optical transmission system 100 as shown in FIG. 1, a variable dispersion compensator may need to be readjusted when switching the optical transmission line from the active system optical transmission line 32 to the standby system optical transmission line 34 since the active system optical transmission line 32 and the standby system optical transmission line 34 are not always of the same distance or do not always have the same type of optical fibers.

Thus, in the optical transmission system 100 according to the embodiment, the dispersion amount of the standby system first optical fiber 34a is measured by the dispersion amount measuring unit 18 provided to the first terminal station 10, and the amount of dispersion compensation to be applied to the standby system first optical fiber 34a is set based on the dispersion amount, during which time the active system first optical fiber 32a is being selected by the optical switches SW21-SW23. When the optical transmission line is switched from the active system first optical fiber 32a to the standby system first optical fiber 34a by the optical switches SW21-SW23, the variable dispersion compensator is controlled so that the amount of dispersion compensation becomes the set amount of dispersion compensation. This allows for an optical main signal to be communicated right after the switching of the optical transmission line to the standby system first optical fiber 34a, and the time for redundancy switching can thus be reduced.

Figure 2:
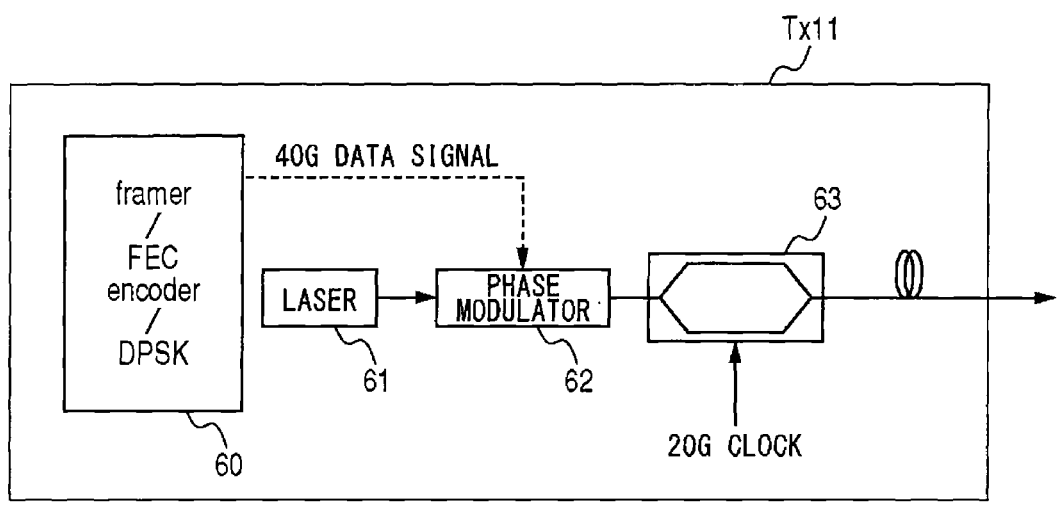
FIG. 2 is a diagram illustrating the configuration of an optical transmission apparatus of a transponder.

FIG. 2 is a diagram illustrating the configuration of an optical transmission apparatus of a transponder. Although the explanation is given by using the optical transmission apparatus Tx11 inside the first transponder TRPN11 of the first terminal station 10 as an example in FIG. 2, an optical transmission apparatus inside another transponder also has a similar configuration.

In FIG. 2, the configuration is shown for the optical transmission apparatus Tx11 when QPSK (Quadrature Phase Shift Keying) is employed as a digital modulation method. In the embodiment, the optical transmission apparatus Tx11 is provided with a transmission frame generation unit 60, a laser 61, a phase modulator 62, and an intensity modulator 63 and transmits an optical main signal of 40 Gbps. The configuration of the optical transmission apparatus Tx11 shown in FIG. 2 is publicly known as the optical transmission apparatus of QPSK. Thus, the detailed explanation thereof is omitted in this specification.

Figure 3:
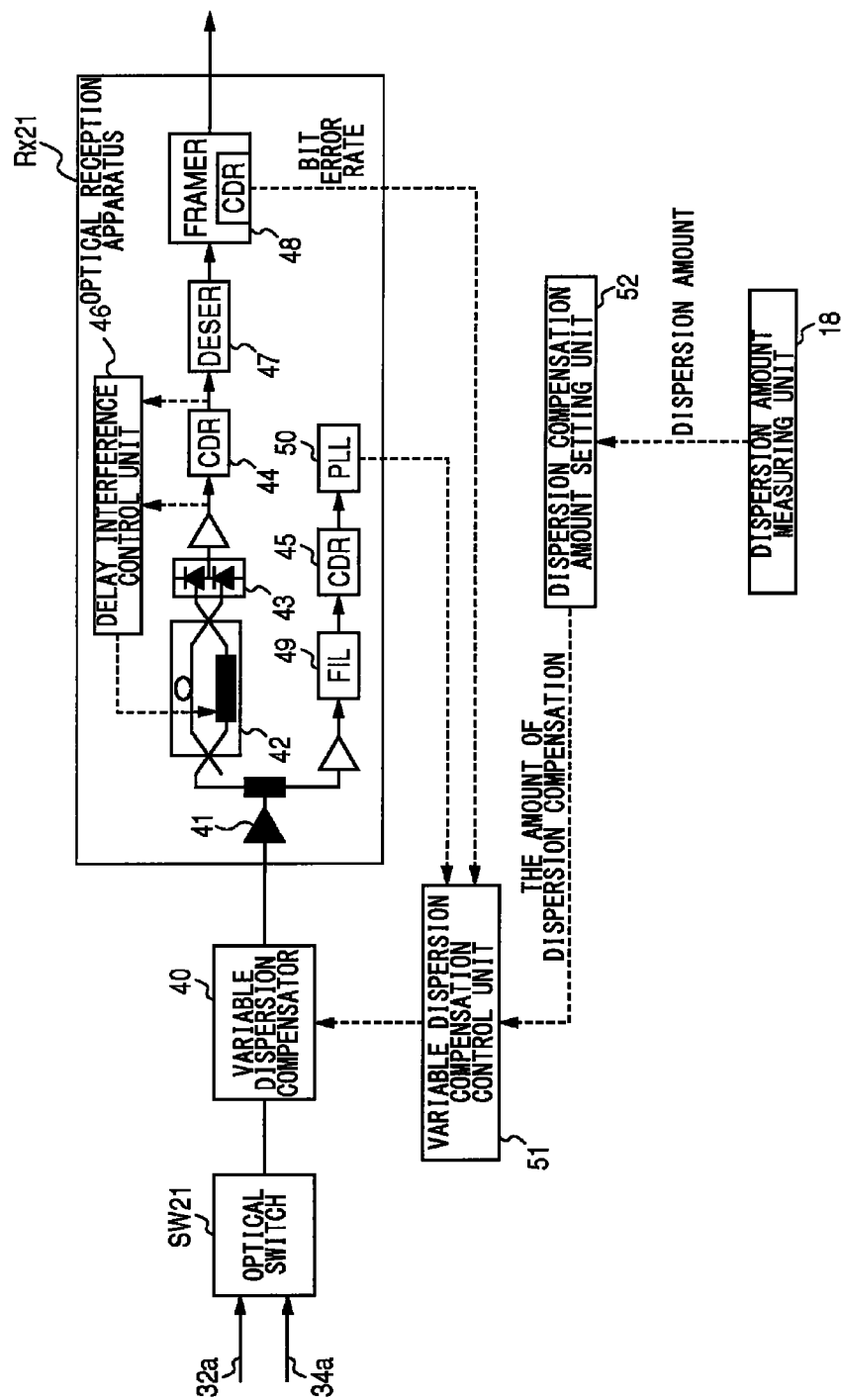
FIG. 3 is a diagram illustrating the configuration of an optical reception apparatus of a transponder and the surrounding configuration thereof.

FIG. 3 is a diagram illustrating the configuration of an optical reception apparatus of a transponder and the surrounding configuration thereof. Although an explanation is given by using the optical reception apparatus Rx21 inside the first transponder TRPN21 of the second terminal station 20 as an example in FIG. 3, an optical reception apparatus inside another transponder also has a similar configuration.

As shown in FIG. 3, an optical switch SW21, a variable dispersion compensator 40, a variable dispersion compensation control unit 51, and a dispersion compensation amount setting unit 52 are provided around the optical reception apparatus Rx21.

The optical reception apparatus Rx21 is provided with an optical preamplifier 41, an interferometer 42, a balanced photodetector 43, clock data recovery (CDR) circuits 44 and 45, a delay interference control unit 46, a parallelization unit 47, a reception frame processing unit 48, a filter 49, a PLL (Phase locked Loop) circuit 50, and the like. The configuration of the optical reception apparatus Rx21 shown in FIG. 3 is publicly known as the optical reception apparatus of QPSK. Thus, a detailed explanation thereof is omitted in this specification.

The variable dispersion compensator 40 is placed between the optical switch SW21 and the optical preamplifier 41 of the optical reception apparatus Rx21. The variable dispersion compensator 40 is a publicly-known optical device capable of compensating for wavelength dispersion of an input light in a variable manner. More specifically, for example, a VIPA (Virtually-Imaged-Phased-Array) device or an optical device using a FBG (Fiber-Bragg-Grating) can be used.

Referring back to FIG. 1, a detailed description is now given of the dispersion amount measuring unit 18. The dispersion amount measuring unit 18 measures the dispersion amount of the standby system first optical fiber 34a when the active system first optical fiber 32a is selected by the optical switches SW21-SW23. The dispersion amount measuring unit 18 is provided with an OTDR unit 18a and a dispersion amount calculation unit 18b.

The OTDR unit 18a measures the distance of the standby system first optical fiber 34a by the OTDR (Optical Time Domain Reflectometer) method. The OTDR unit 18a includes a pulse generator and a reflection detection circuit. The pulse generator releases a pulse light to the standby system first optical fiber 34a from the output terminal of the second transmission amplifier 16b. The reflection detection circuit detects the reflected light reflected at the input terminal of the second reception amplifier 27b and calculates the distance of the standby system first optical fiber 34a.

The dispersion amount calculation unit 18b calculates the dispersion amount of the standby system first optical fiber 34a based on the calculated distance of the standby system first optical fiber 34a and on the dispersion coefficient of the standby system first optical fiber 34a that is set in advance. The dispersion amount needs to be calculated for each wavelength since the dispersion amount depends on the wavelength. There are several methods of calculating the dispersion amount for each wavelength. For example, the dispersion coefficient of each wavelength may be stored in advance, and the dispersion amount of each wavelength may be directly calculated by multiplying the distance of the standby system first optical fiber 34a by the dispersion coefficient of the wavelength. Alternatively, the dispersion amount of a specific wavelength (for example, 1550 nm) may be calculated, and the dispersion amount of each wavelength may be indirectly calculated by multiplying the calculated dispersion amount by a wavelength-dependent coefficient.

The information on the dispersion amount of the standby system first optical fiber 34a measured by the dispersion amount measuring unit 18 of the first terminal station 10 is transmitted to each transponder of the opposite second terminal station 20 by using an optical supervisory channel (OSC) signal having a different wavelength from that of an optical main signal.

The dispersion compensation amount setting unit 52 receives the information on the dispersion amount of the standby system first optical fiber 34a from the dispersion amount measuring unit 18 of the first terminal station 10 and sets the amount of the dispersion compensation to be applied to the standby system first optical fiber 34a based on the information on the dispersion amount. More specifically, the amount of dispersion compensation is set so that the cumulative amount of wavelength dispersion of the standby system first optical fiber 34a becomes zero. The set amount of dispersion compensation is provided to the variable dispersion compensation control unit 51.

The variable dispersion compensation control unit 51 controls the amount of dispersion compensation of the variable dispersion compensator 40 in a variable manner so that the bit error rate provided from the reception frame processing unit 48 becomes the smallest under the normal status of operation, in other words, when the active system first optical fiber 32a is being selected by the optical switch SW21. Alternatively, the variable dispersion compensation control unit 51 may control the amount of dispersion compensation of the variable dispersion compensator 40 in a variable manner so that the number of error corrections provided from the reception frame processing unit 48 becomes the smallest.

When the optical transmission line is switched from the active system first optical fiber 32a to the standby system first optical fiber 34a by the optical switches SW21-SW23 in the event that a failure such as disconnection occurs in the active system first optical fiber 32a, the variable dispersion compensation control unit 51 controls the variable dispersion compensator 40 so that the amount of dispersion compensation becomes the amount of dispersion compensation set by the dispersion compensation amount setting unit 52. This allows for the wavelength dispersion of the standby system first optical fiber 34a to be compensated immediately after the switching of the optical transmission line to the standby system first optical fiber 34a, and the time for redundancy switching can thus be reduced.

The variable dispersion compensation control unit 51 may control the amount of dispersion compensation of the variable dispersion compensator 40 in a variable manner so that the bit error rate provided by the reception frame processing unit 48 becomes the smallest after controlling the amount of dispersion compensation of the variable dispersion compensator 40 to be the amount of dispersion compensation set by the dispersion compensation amount setting unit 52. Alternatively, the variable dispersion compensation control unit 51 may control the amount of dispersion compensation of the variable dispersion compensator 40 in a variable manner so that the number of error corrections provided from the reception frame processing unit 48 becomes the smallest. This allows for the change of the dispersion amount due to the temperature change in the standby system first optical fiber 34a to be absorbed.

In the embodiment, each transponder is required to have only one variable dispersion compensator 40; thus, the optical transmission system 100 can be inexpensively configured.

Figure 4:
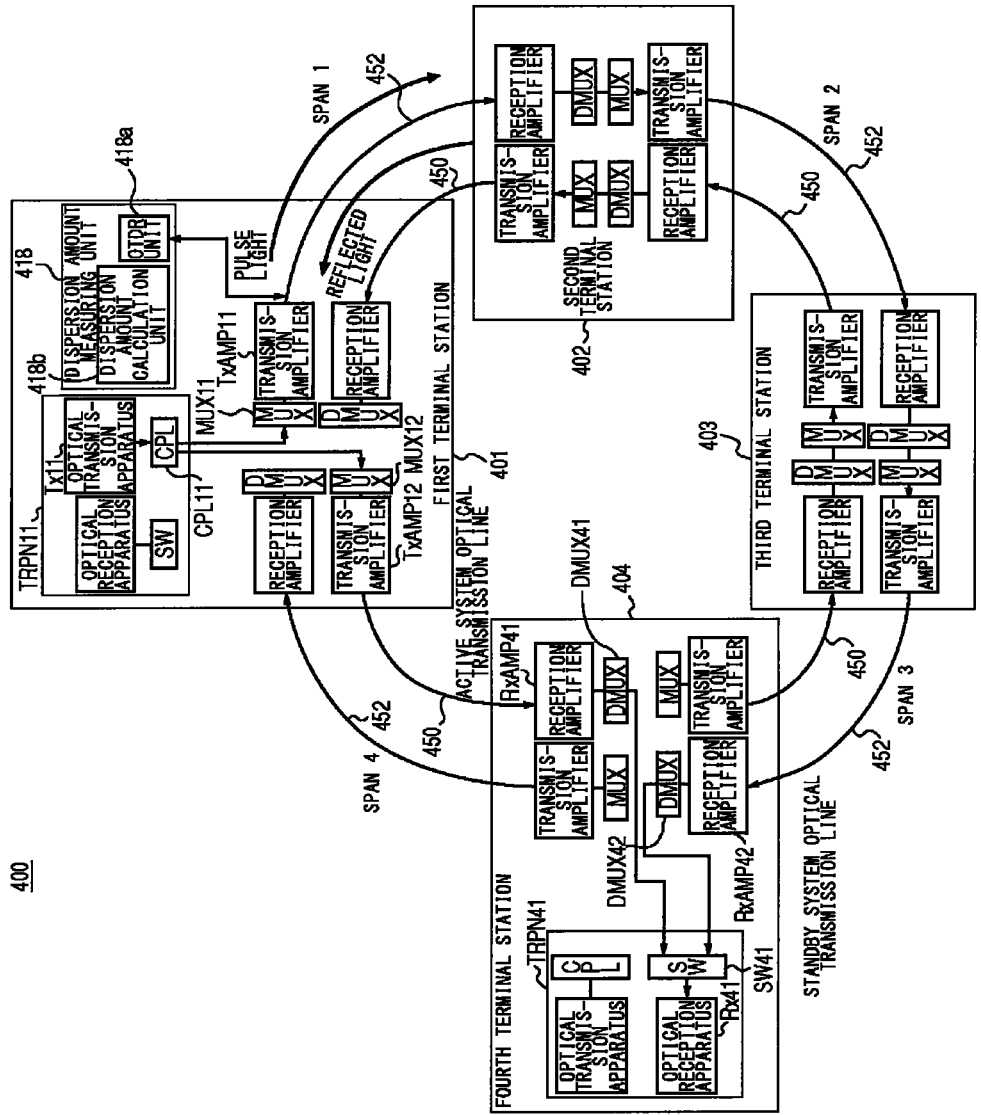
FIG. 4 is a diagram illustrating the configuration of an optical transmission system according to another embodiment of the present invention.

FIG. 4 is a diagram illustrating the configuration of an optical transmission system 400 according to another embodiment of the present invention. The optical transmission system 400 shown in FIG. 4 configures an optical ring network of the UPSR (Unidirectional Path Switched Ring) method.

The optical transmission system 400 is provided with a first terminal station 401, a second terminal station 402, a third terminal station 403, and a fourth terminal station 404 and configures a ring-shaped optical communication network with two optical transmission lines, wherein a first optical transmission line 450 and a second optical transmission line 452 both connect adjacent terminal stations. In the optical transmission system 400 shown in FIG. 4, an optical main signal is transmitted counterclockwise in the first optical transmission line 450, and an optical main signal is transmitted clockwise in the second optical transmission line 452.

The first terminal station 401 through the fourth terminal station 404 have the similar configurations as those of the first terminal station 10 and of the second terminal station 20, which are shown in FIG. 1. The transmission of an optical main signal from the optical transmission apparatus Tx11 inside the first transponder TRPN11 of the first terminal station 401 to the optical reception apparatus Rx41 inside the transponder TRPN41 of the fourth terminal station 404 is used as an example. In this case, for an optical main signal, there are two transmission paths used as a transmission path from the first terminal station 401 to the fourth terminal station 404. One is a path where an optical main signal is directly transmitted from the first terminal station 401 to the fourth terminal station 404 passing through the first optical transmission line 450. This path is herein referred to as an "active system optical transmission line." The other one is a path where an optical main signal is transmitted, passing through the second optical transmission line 452 via the second terminal station 402 to the third terminal station 403. This path is herein referred to as a "standby system optical transmission line." As described above, the optical transmission line 400 has an optical transmission line redundantly configured with the active system optical transmission line and the standby system optical transmission line.

The first terminal station 401 and fourth terminal station 404, shown in FIG. 4, are each provided with one transponder; however, they each may be provided with multiple transponders. For the second terminal station 402 and third terminal station 403 as shown in FIG. 4, the illustration of the transponders is omitted.

The operation of the optical transmission system 400 is now described. An optical main signal that is transmitted from the optical transmission apparatus Tx11 inside the first transponder TRPN11 of the first terminal station 401 is branched into two signals by the coupler CPL11. In the embodiment, the optical main signal output from the optical transmission apparatus Tx11 is, for example, an optical main signal having a high transmission speed of 40 Gbps or the like. One of the branched optical main signals is multiplexed with an optical main signal from other transponders (not shown) by a first multiplexer MUX11. The other one of the branched optical main signals is multiplexed with an optical main signal from other transponders by a second multiplexer MUX12.

The optical main signal that is multiplexed by the first multiplexer MUX11 (hereinafter, also referred to as a standby system WDM optical main signal) enters the second optical transmission line 452 after being amplified by the first transmission amplifier TxAMP11. The standby system WDM optical main signal passing inside the second optical transmission line 452 enters the second reception amplifier RxAMP42 of the fourth terminal station 404 after going through the second terminal station 402 and the third terminal station 403. After being amplified by the second reception amplifier RxAMP42, the standby system WDM optical main signal is demultiplexed by the second demultiplexer DMUX42, and the demultiplexed optical main signal enters the optical switch SW41 of the transponder TRPN41.

On the other hand, the optical main signal that is multiplexed by the second multiplexer MUX12 (hereinafter, also referred to as an active system WDM optical main signal) enters the first optical transmission line 450 after being amplified by the second transmission amplifier TxAMP12. The active system WDM optical main signal passing inside the first optical transmission line 450 enters the first reception amplifier RxAMP41 of the fourth terminal station 404. After being amplified by the first reception amplifier RxAMP41, the active system WDM optical main signal is demultiplexed by the first demultiplexer DMUX41, and the demultiplexed optical main signal enters the optical switch SW41 of the transponder TRPN41.

The optical switch SW41 selects either the optical main signal passed through the active system optical transmission line or the optical main signal passed through the standby system optical transmission line. The optical main signal selected by the optical switch SW41 is received by the optical reception apparatus Rx41, and predetermined signal processes such as photoelectric conversion, timing extraction, identification and reproduction, and error correction are then performed on the optical main signal.

Under the normal status of operation, the optical switch SW41 selects the active system optical transmission line. In the event of a failure in the active system optical transmission line, such as disconnection, the optical switch SW41 switches the optical transmission line from the active system optical transmission line to the standby system optical transmission line. As described above, the optical transmission line redundantly configured with the active system optical transmission line and the standby system optical transmission line allows for the optical transmission system 400 to solve an optical transmission line failure.

The transmission speed is also at least 40 Gbps in the embodiment, it becomes necessary to perform single dispersion compensation of a WDM optical main signal by using dispersion compensating fibers as well as dispersion compensation individually on each wavelength-divided optical main signal by using a variable dispersion compensator. The configuration of the optical reception apparatus Rx41 and the surrounding configuration thereof is similar to that shown in FIG. 3 in the embodiment, and the variable dispersion compensator is placed between the optical switch SW41 and the optical reception apparatus Rx41.

As shown in FIG. 4, the optical transmission system 400 is a ring-shaped optical communication network, and the distance of the active system optical transmission line and the distance of the standby system optical transmission line are thus completely different. Therefore, a readjustment of the variable dispersion compensator is necessary when switching the optical transmission line from the active system optical transmission line to the standby system optical transmission line.

In the optical transmission system 400 according to the embodiment, the dispersion amount of the standby system optical transmission line is measured by using the OTDR method, and the amount of dispersion compensation to be applied to the standby system optical transmission line is set based on the dispersion amount, while the active system optical transmission line is being selected by the optical switch SW41. When the optical transmission line is switched from the active system optical transmission line to the standby system optical transmission line by the optical switch SW41, the variable dispersion compensator is controlled so that the amount of dispersion compensation becomes the set amount of dispersion compensation. This allows for an optical main signal to be communicated right after the switching of the optical transmission line to the standby system optical transmission line, and the time for redundancy switching can thus be reduced.

When measuring the dispersion amount of the standby system optical transmission line by using the OTDR method in the optical transmission system 400, the dispersion amount is measured for a span 1 between the first terminal station 401 and the second terminal station 402, a span 2 between the second terminal station 402 and the third terminal station 403, and a span 3 between the third terminal station 403 and the fourth terminal station 404, and the sum of the dispersion amounts is determined to be the dispersion of the standby system optical transmission line. Each terminal station is provided with a dispersion amount measuring unit 418 (only shown in the first terminal station 401 in FIG. 4) in order to measure the dispersion amount for each span.

The configuration of the dispersion amount measuring unit 418 is similar to the embodiment in FIG. 1. To be more specific about measuring the dispersion amount of the span 1 between the first terminal station 401 and the second terminal station 402, the distance of the span 1 is first measured by an OTDR unit 418a. A dispersion amount calculation unit 418b calculates the dispersion amount of the span 1 based on the calculated distance of the span 1 and on the dispersion coefficient of the span 1 that is set in advance. The measurement of the dispersion amount is similarly performed for the span 2 and span 3. The information on the measured dispersion amounts of the spans 1-3 is transmitted to the transponder TRPN41 of the fourth terminal station 404 by using a supervisory channel signal. The dispersion compensation amount setting unit 52 shown in FIG. 3 sets, by using the sum of the dispersion amounts of the spans 1-3 as the dispersion amount of the standby system optical transmission line, the amount of dispersion compensation based on the sum of the dispersion amounts. When the optical transmission line is switched to the standby system optical transmission line, the variable dispersion compensation control unit 51 controls the variable dispersion compensator 40 so that the amount of dispersion compensation becomes the set amount of dispersion compensation. This allows for quick redundancy switching of an optical transmission line from the active system optical transmission line to the standby system optical transmission line.

The optical transmission system 400 in FIG. 4 measures a dispersion amount for each span. Thus, the dispersion amount of the standby system optical transmission line can be accurately measured even when the type of optical fiber of each span is different.

Figure 5:
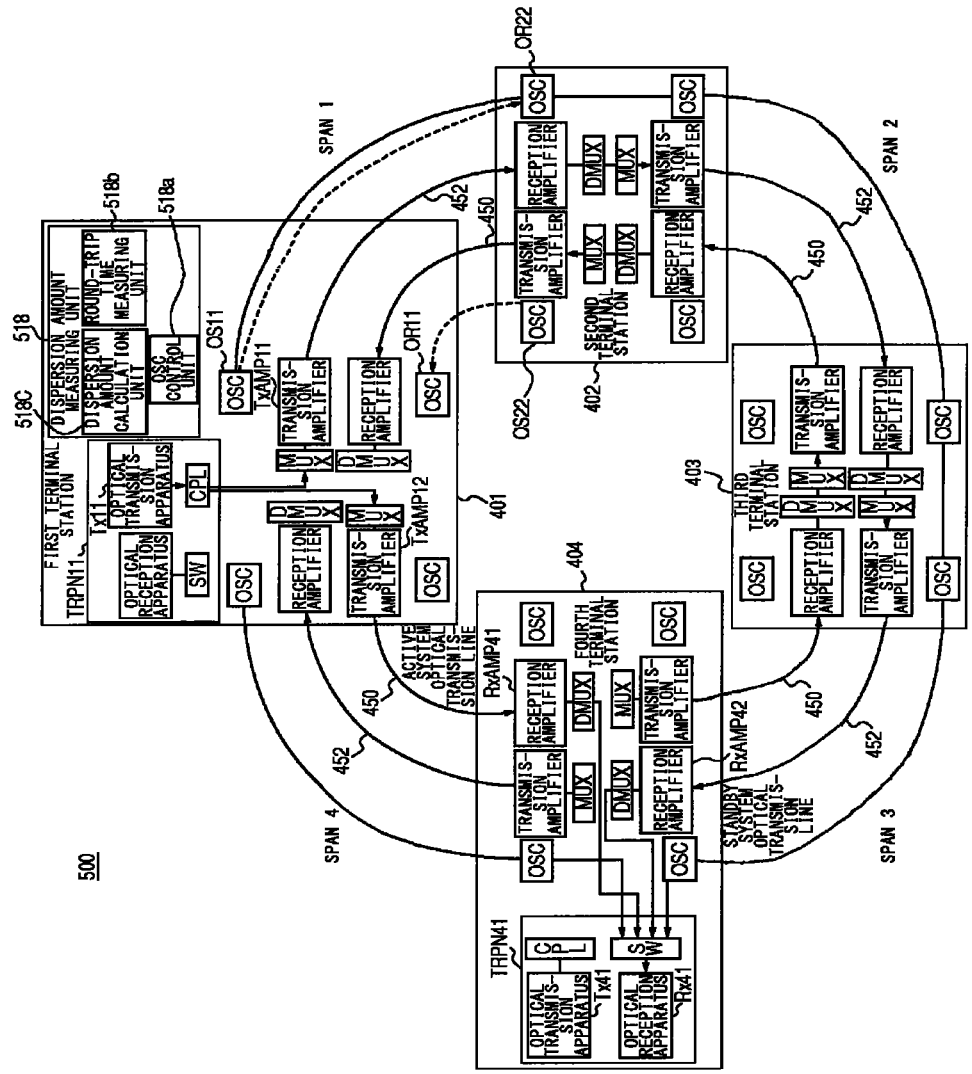
FIG. 5 is a diagram illustrating the configuration of an optical transmission system according to yet another embodiment of the present invention.

FIG. 5 is a diagram illustrating the configuration of an optical transmission system 500 according to yet another embodiment of the present invention. The optical transmission system 500 configures an optical ring network of the UPSR (Unidirectional Path Switched Ring) method similarly to the optical transmission system 400 shown in FIG. 4. In the optical transmission system 500, like numerals represent like constituting elements that are identical to or correspond to those of the optical transmission system 400 shown in FIG. 4, and the description thereof is omitted appropriately.

The optical transmission system 500 is different in the configuration of the a dispersion amount measuring unit 518 from the optical transmission system 400 in FIG. 4. A detailed description will be made in the following regarding the measurement of the dispersion amount of the span 1 between the first terminal station 401 and the second terminal station 402. As shown in FIG. 5, a dispersion amount measuring unit 518 is provided with a supervisory control signal control unit 518a, a round-trip time measuring unit 518b, and a dispersion amount calculation unit 518c.

In the optical transmission system 500, each terminal station is provided with an OSC transmitter for transmitting a supervisory control signal and an OSC receiver for receiving a supervisory control signal. For example, for transmission and reception of a supervisory control signal between the first terminal station 401 and the second terminal station 402, an OSC transmitter OS11 and OSC receiver OR11 of the first terminal station 401 and an OSC transmitter OS22 and OSC receiver OR22 of the second terminal station 402 are used.

By controlling the OSC transmitter and OSC receiver, the supervisory control signal control unit 518a generates a supervisory control signal for measurement of a predetermined distance and shuttles the supervisory control signal through the span 1 between the first terminal station 401 and the second terminal station 402. More specifically, the supervisory control signal control unit 518a generates a supervisory control signal for measurement of a predetermined distance in the OSC transmitter OS11, and the supervisory control signal is then transmitted to the OSC receiver OR22 of the second terminal station 402. The supervisory control signal received by the OSC receiver OR22 of the second terminal station 402 is returned back to the OSC receiver OR11 of the first terminal station 401 by the OSC transmitter OS22.

The round-trip time measuring unit 518b measures the time required for the supervisory control signal to travel back and forth the span 1 between the first terminal station 401 and the second terminal station 402. If the time required for the supervisory control signal to return to the OSC receiver OR11 after the signal is transmitted from the OSC transmitter OS11 is given by T1, and if the time required for the preparation for returning the supervisory control signal at the second terminal station 402 is given by T2, the time T0 required for the supervisory control signal to travel back and forth the span 1 is given as follows:

$$T0 = T1 - T2 \quad \text{Equation (1)}$$

The dispersion amount calculation unit 518c calculates the distance of the standby system optical transmission line based on the round-trip time T0 measured by the round-trip time measuring unit 518b. If the speed of the supervisory control signal being transmitted through a optical transmission line of the span 1 is given by V1, a distance L1 of the optical transmission line of the span 1 is given as follows:

$$L1 = T0 \times V1/2 \quad \text{Equation (2)}$$

The dispersion amount calculation unit 518c calculates the dispersion amount of the optical transmission line of the span 1 based on the distance L1 and on the dispersion coefficient of the optical transmission line of the span 1 that is set in advance. If the dispersion coefficient of the optical transmission line of the span 1 for a specific wavelength is given by m1, the dispersion amount α1 of the optical transmission line of the span 1 is given as follows:

$$\alpha 1 = m1 \times L1 \quad \text{Equation (3)}$$

The dispersion amount α1 needs to be multiplied by a wavelength-dependent coefficient in order to calculate the dispersion amount of other wavelengths since the dispersion amount depends on the wavelength.

The dispersion amounts for the span 2 between the second terminal station 402 and the third terminal station 403 and for the span 3 between the third terminal station 403 and the fourth terminal station 404 can be measured in the same manner as described above. The information on the measured dispersion amounts of the spans 1-3 is transmitted to the transponder TRPN41 of the fourth terminal station 404 by using a supervisory channel signal. The dispersion compensation amount setting unit 52 shown in FIG. 3 sets, by using the sum of the dispersion amounts of the spans 1-3 as the dispersion amount of the standby system optical transmission line, the amount of dispersion compensation based on the sum of the dispersion amounts. When the optical transmission line is switched to the standby system optical transmission line, the variable dispersion compensation control unit 51 controls the variable dispersion compensator so that the amount of dispersion compensation becomes the set amount of dispersion compensation. This allows for quick redundancy switching of an optical transmission line from the active system optical transmission line to the standby system optical transmission line.

The optical transmission system 500 according to the embodiment also measures a dispersion amount for each span. Thus, the dispersion amount of the standby system optical transmission line can be accurately measured even when the type of optical fiber of each span is different.

A method of measuring the dispersion amount of a standby system optical transmission line by using a supervisory control signal in an optical ring network of the UPSR method is described above. This measuring method can be also applied to a point-to-point WDM optical transmission system as shown in FIG. 1.

Figure 6:
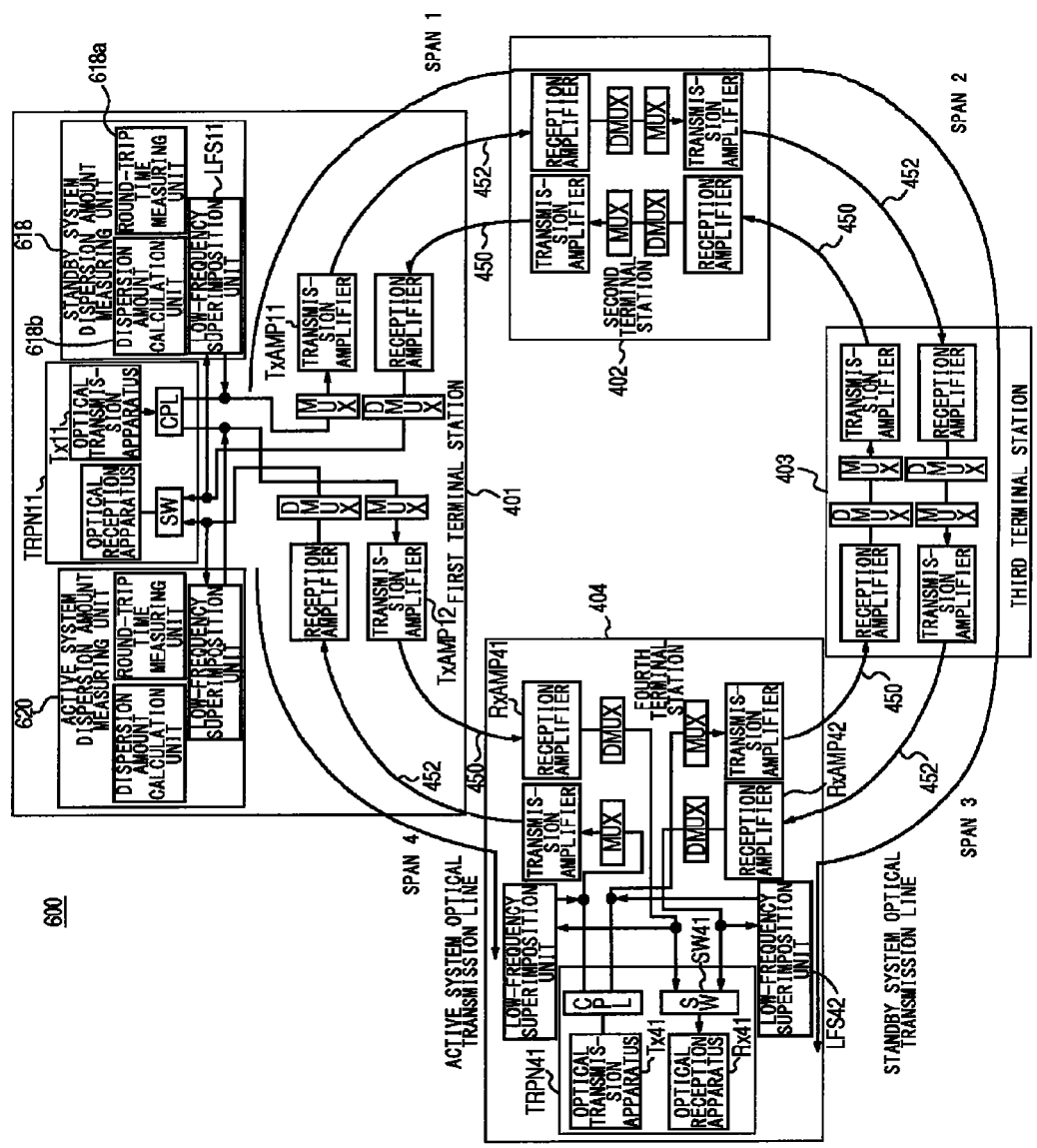
FIG. 6 is a diagram illustrating the configuration of an optical transmission system according to yet another embodiment of the present invention.

FIG. 6 is a diagram illustrating the configuration of an optical transmission system 600 according to yet another embodiment of the present invention. The optical transmission system 600 also configures an optical ring network of the UPSR (Unidirectional Path Switched Ring) method, similar to that of optical transmission system 400 shown in FIG. 4. In the optical transmission system 600, like numerals represent like constituting elements that are identical to or correspond to those of the optical transmission system 400 shown in FIG. 4, and the description thereof is omitted appropriately.

The optical transmission system 600 is different in its configuration of the dispersion amount measuring unit from the optical transmission system 400 in FIG. 4. A detailed description will be made in the following regarding the measurement of the dispersion amount of a standby system optical transmission line of the sum of the span 1, the span 2, and the span 3. A standby system dispersion amount measuring unit 618 is provided with a low-frequency superimposition unit LFS11, a low-frequency superimposition unit LFS42, a round-trip time measuring unit 618a, and a dispersion amount calculation unit 618b. The low-frequency superimposition unit LFS11, the round-trip time measuring unit 618a, and the dispersion amount calculation unit 618b are provided in the first terminal station 401, and the low-frequency superimposition unit LFS42 is provided to the fourth terminal station 404.

The low-frequency superimposition unit LFS11 superimposes a supervisory control signal for the distance measurement of a frequency lower than that of an optical main signal on an optical main signal output from the optical transmission apparatus Tx11 of the first terminal station 401. When the transmission speed of the optical main signal is 40 Gbps, the frequency of the supervisory control signal for the distance measurement may be, for example, approximately 150 MHz. The supervisory control signal for the distance measurement superimposed on the optical main signal is transmitted to the low-frequency superimposition unit LFS42 of the fourth terminal station 404 via the second terminal station 402 and the third terminal station 403. The low-frequency superimposition unit LFS42 of the fourth terminal station 404 superimposes the received supervisory control signal for the distance measurement on the optical main signal output from the optical transmission apparatus Tx41 of the fourth terminal station 404 and returns the superimposed signal toward the first terminal station 401. The returned signal is received by the low-frequency superimposition unit LFS11 via the third terminal station 403 and the second terminal station 402.

The round-trip time measuring unit 618a measures the time required for the supervisory control signal for the distance measurement to travel back and forth a standby system optical transmission line. If the time required for the supervisory control signal for the distance measurement to return back to the low-frequency superimposition unit LSF11 after the signal is transmitted from the low-frequency superimposition unit LFS11 is given by T4, and if the time required for the preparation of returning the supervisory control signal for the distance measurement at a low-frequency superimposition unit LFS42 is given by T5, the time T3 required for the supervisory control signal for the distance measurement to travel back and forth the standby system optical transmission line is given as follows:

$$T3 = T4 - T5 \qquad \text{Equation (4)}$$

The dispersion amount calculation unit 618b calculates the distance of a standby system optical transmission line based on the round-trip time T3 measured by the round-trip time measuring unit 618a. If the speed of the supervisory control signal being transmitted through a standby system optical transmission line is given by V2, the distance L2 of the standby system optical transmission line is given as follows:

$$L2 = T3 \times V2/2 \qquad \text{Equation (5)}$$

The dispersion amount calculation unit 618b calculates the dispersion amount of the standby system optical transmission line based on the distance L2 and on the dispersion coefficient of the standby system optical transmission line that is set in advance. If the dispersion coefficient of the standby system optical transmission line for a specific wavelength is given by m2, the dispersion amount α2 of the standby system optical transmission line is given as follows:

$$\alpha 2 = m2 \times L2 \qquad \text{Equation (6)}$$

The dispersion amount α2 needs to be multiplied by a wavelength-dependent coefficient in order to calculate the dispersion amount of other wavelengths since the dispersion amount depends on the wavelength.

The information on the dispersion amount of the standby system optical transmission line measured by the standby system dispersion amount measuring unit 618 of the first terminal station 401 is superimposed on an optical main signal by the low-frequency superimposition unit LFS11 and then transmitted to the low-frequency superimposition unit LFS42 of the fourth terminal station 404. The dispersion compensation amount setting unit 52 shown in FIG. 3 sets the amount of dispersion compensation based on the information on the dispersion amount received by the low-frequency superimposition unit LFS42. When the optical transmission line is switched from the active system optical transmission line to the standby system optical transmission line, the variable dispersion compensation control unit 51 controls the variable dispersion compensator so that the amount of dispersion compensation becomes the set amount of dispersion compensation. This allows for prompt redundancy switching of an optical transmission line from the active system optical transmission line to the standby system optical transmission line.

As shown in FIG. 6, the optical transmission system 600 may be provided with an active system dispersion amount measuring unit 620 so as to measure the dispersion amount of an active system optical transmission line. The dispersion of the active system optical transmission line can be measured by the active system dispersion amount measuring unit 620 while the standby system optical transmission line is being selected by the optical switch SW41 of the fourth terminal station 404. By first measuring the dispersion of the active system optical transmission line followed by setting the proper amount of dispersion compensation for the active system optical transmission line in advance, the time is reduced for the reduction in the time for redundancy switching of the optical transmission line from the standby system optical transmission line to the active system optical transmission line.

The optical transmission system 600 of FIG. 6 can directly measure the distance between a transmission terminal station and a reception terminal station. Thus, the process of obtaining the sum of the dispersion amounts of the respective spans is no longer necessary.

A method of measuring the dispersion amount of a standby system optical transmission line by superimposing a supervisory control signal for the distance measurement on an optical main signal in an optical ring network of the UPSR method is described above. This measuring method can be also applied to a point-to-point WDM optical transmission system as shown in FIG. 1.

Figure 7:
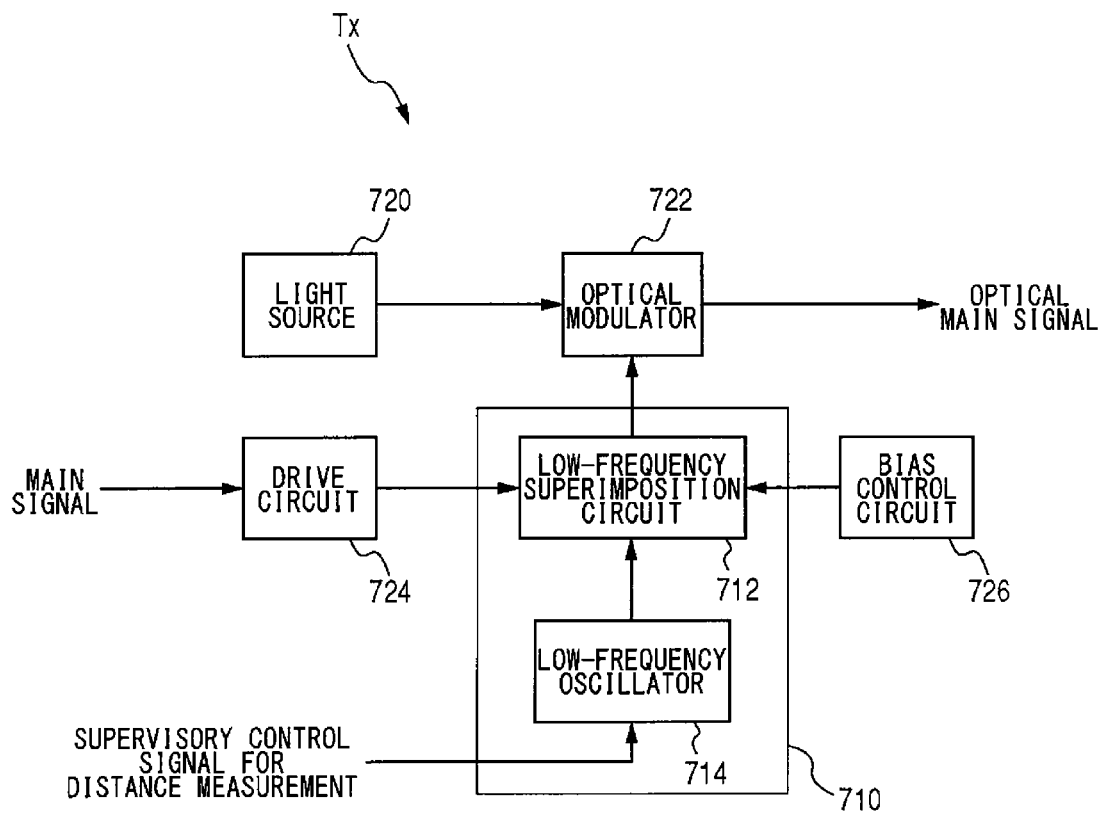
FIG. 7 is a diagram for illustrating the configuration of a transmission unit of a low-frequency superimposition unit.

FIG. 7 is a diagram for illustrating the configuration of a transmission unit 710 of a low-frequency superimposition unit for transmitting a supervisory control signal for the distance measurement. As shown in FIG. 7, the transmission unit 710 of a low-frequency superimposition unit is set in the optical transmission apparatus Tx that transmits an optical main signal.

The transmission unit 710 of the low-frequency superimposition unit is provided with a low-frequency superimposition circuit 712 and a low-frequency oscillator 714. The low-frequency oscillator 714 into which a supervisory control signal for the distance measurement is input modulates the signal into a predetermined low frequency signal and then provides the low frequency signal to the low-frequency superimposition circuit 712. To the low-frequency superimposition circuit 712, the drive signal of a main signal and a bias control signal are input from a drive circuit 724 and a bias control circuit 726, respectively. The low-frequency superimposition circuit 712 superimposes the low-frequency supervisory control signal for the distance measurement on the drive signal of the main signal. The main signal on which the supervisory control signal for the distance measurement is superimposed is input into an optical modulator 722. The optical modulator 722 externally modulates the optical signal output from a light source 720 and outputs the optical main signal on which the supervisory control signal for the distance measurement is superimposed.

Figure 8:
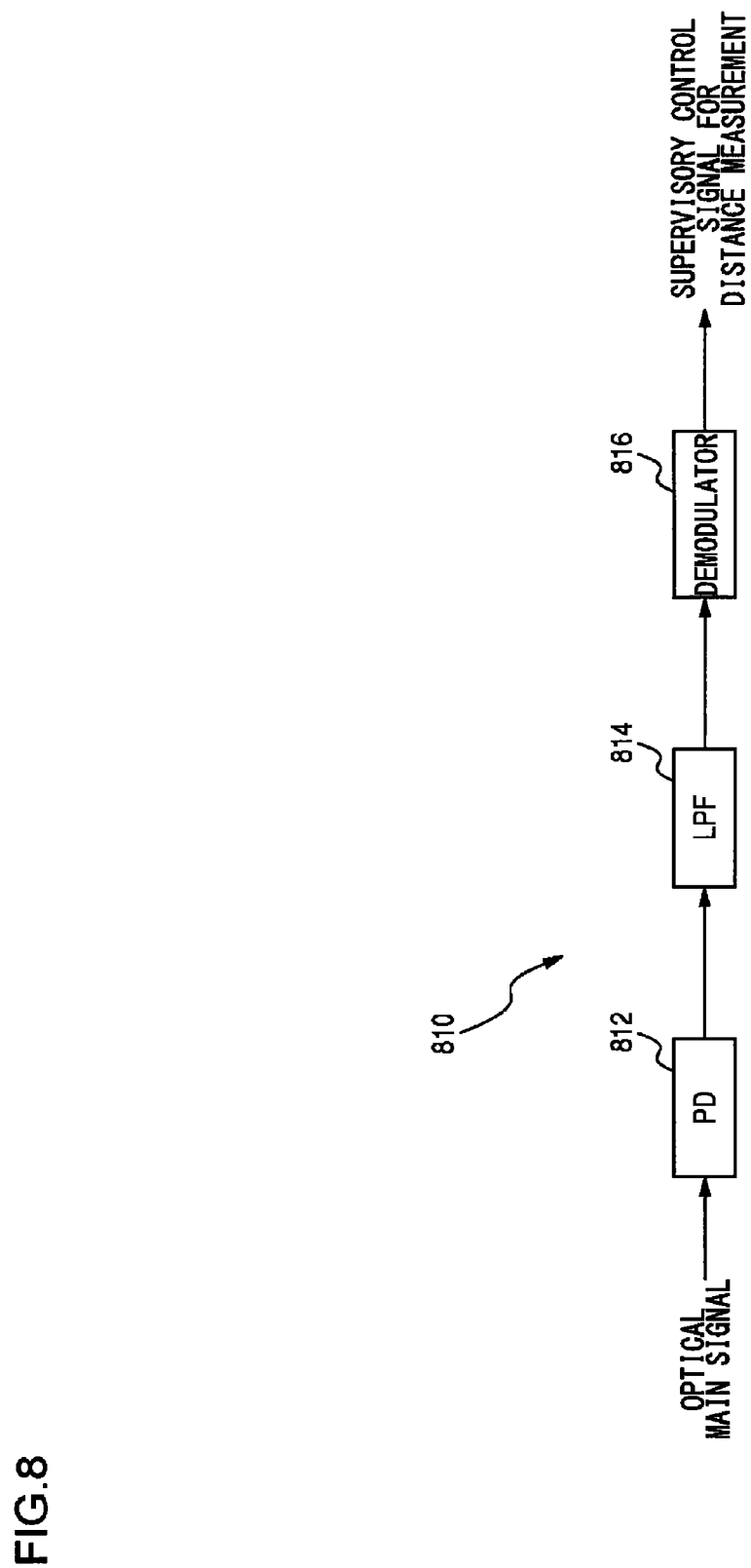
FIG. 8 is a diagram for illustrating the configuration of a reception unit of a low-frequency superimposition unit.

FIG. 8 is a diagram illustrating the configuration of a reception unit of a low-frequency superimposition unit for receiving a supervisory control signal for the distance measurement. As shown in FIG. 8, a reception unit 810 of a low-frequency superimposition unit is provided with a photodiode 812, a low-pass filter 814, and a demodulator 816. The photodiode 812 photoelectric-converts an optical main signal. The low-pass filter 814 allows for the passage of only a low-frequency component of the photoelectric-converted main signal. The demodulator 816 demodulates a supervisory control signal for the distance measurement by using the low-frequency component of the main signal that has passed through the low-pass filter 814.

Figure 9:
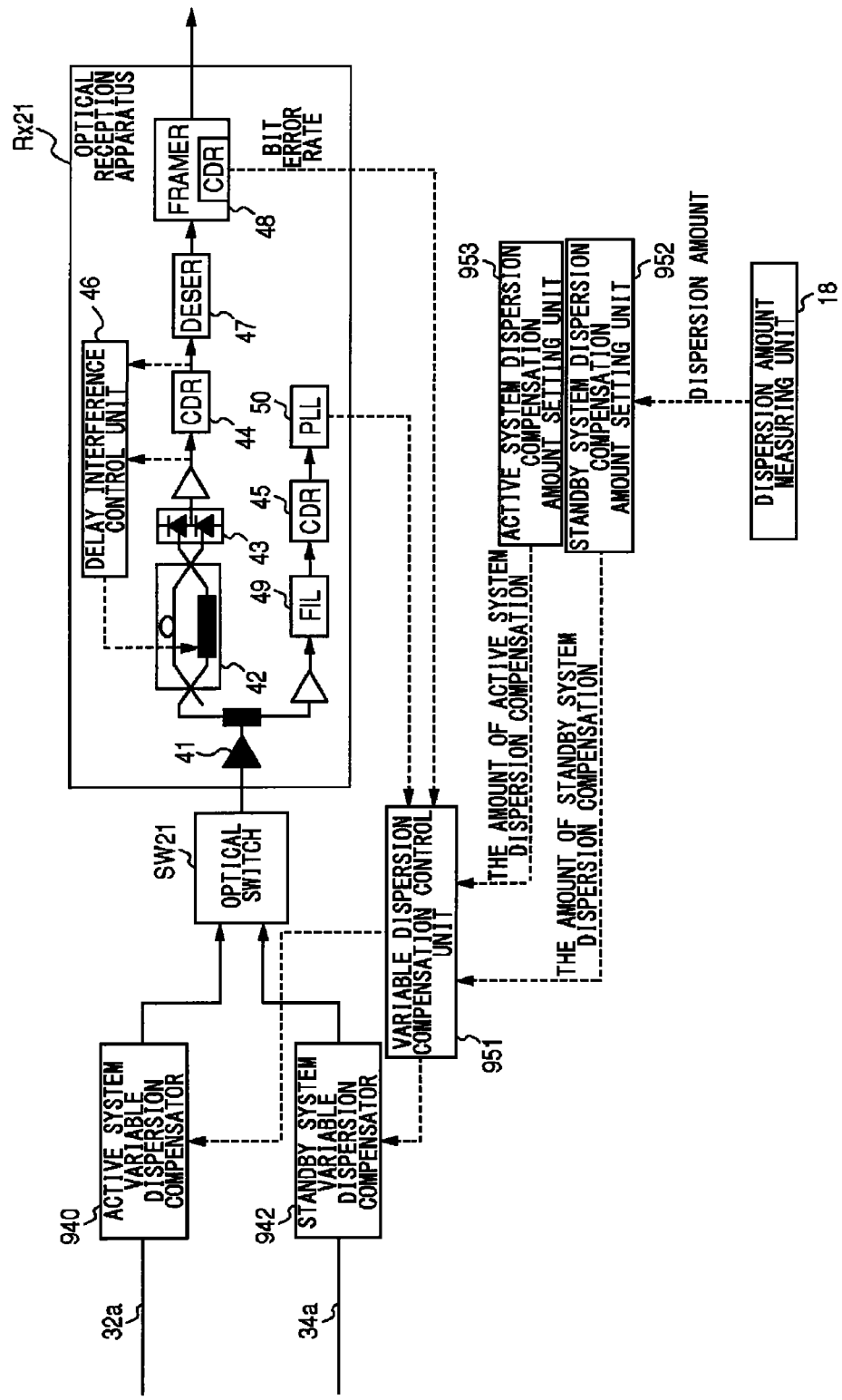
FIG. 9 is a diagram illustrating an exemplary variation of the configuration of an optical reception apparatus of a transponder and the surrounding configuration thereof.

FIG. 9 is a diagram illustrating an exemplary variation of the configuration of an optical reception apparatus of a transponder and the surrounding configuration thereof. Similarly to FIG. 3, the explanation is given by using the optical reception apparatus Rx21 inside the first transponder TRPN21 of the second terminal station 20 shown in FIG. 1, as an example. In an exemplary variation as shown in FIG. 9, like numerals represent like constituting elements that are identical to or correspond to those of the embodiment shown in FIG. 3, and the description thereof is omitted appropriately.

In the exemplary variation shown in FIG. 9, an active system variable dispersion compensator 940 and a standby system variable dispersion compensator 942 are placed in each of an active system first optical fiber 32*a* and a standby system first optical fiber 34*a*. An optical switch SW21 is placed among the active system variable dispersion compensator 940 and standby system variable dispersion compensator 942 and an optical reception apparatus Rx21. Therefore, in the exemplary variation shown in FIG. 9, an optical main signal, on which dispersion compensation has been performed by the active system variable dispersion compensator 940 or the standby system variable dispersion compensator 942, is switched by the optical switch SW21.

A standby system dispersion compensation amount setting unit 952 receives the information on the dispersion amount of the standby system first optical fiber 34*a* from the dispersion amount measuring unit 18 of the first terminal station 10, shown in FIG. 1, and sets the amount of standby system dispersion compensation to be applied to the standby system first optical fiber 34*a* based on the information on the dispersion amount. The amount of standby system dispersion compensation is provided to the variable dispersion compensation control unit 51.

A variable dispersion compensation control unit 951 controls the amount of dispersion compensation of an active system variable dispersion compensator 940 in a variable manner so that the bit error rate provided from the reception frame processing unit 48 becomes the smallest under the normal status of operation, in other words, when the active system first optical fiber 32*a* is being selected by the optical switch SW21. Alternatively, the variable dispersion compensation control unit 951 may control the amount of dispersion compensation of the active system variable dispersion compensator 940 in a variable manner so that the number of error corrections provided from the reception frame processing unit 48 becomes the smallest.

Furthermore, in the exemplary variation, the variable dispersion compensation control unit 951 controls the standby system variable dispersion compensator 942 so that the amount of standby system dispersion compensation becomes the amount of standby system dispersion compensation as set by the standby system dispersion compensation amount setting unit 952. In the exemplary variation, the control of the standby system variable dispersion compensator 942 is performed regardless of switching of the optical transmission line by the optical switch SW21. This allows for controlling the standby system variable dispersion compensator 942 so that the amount of dispersion compensation becomes the proper amount of dispersion compensation even when the active system first optical fiber 32*a* is being put into operation. When the optical transmission line is switched from the active system first optical fiber 32*a* to the standby system first optical fiber 34*a* by the optical switch SW21 in the event a failure, such as disconnection, occurs in the active system first optical fiber 32*a*, an optical main signal can be communicated approximately at the same time as switching by the optical switch SW21 since the standby system variable dispersion compensator 942 has already been controlled so that the amount of dispersion compensation becomes the proper amount of dispersion compensation. As described above, the configuration of the exemplary variation is advantageous regarding the time for redundancy switching as compared to that of the embodiment of FIG. 3.

The explanation is given by using the optical reception apparatus Rx21 inside the first transponder TRPN21 of the second terminal station 20 shown in FIG. 1 as an example. The configuration of the optical reception apparatus and the surrounding configuration thereof as shown in FIG. 9 can be also applied to, for example, the optical transmission system 400 shown in FIG. 4, the optical transmission system 500 shown in FIG. 5, and the optical transmission system 600 shown in FIG. 6.

For example, as the optical transmission system 600 shown in FIG. 6, when the optical transmission system 600 is provided with the active system dispersion amount measuring unit 620, which measures the dispersion amount of the active system optical transmission line, an active system dispersion compensation amount setting unit 953 that sets the proper amount of dispersion compensation to an active system dispersion compensation amount setting unit as shown in FIG. 9 may be provided. In this case, the variable dispersion compensation control unit 951 controls the active system variable dispersion compensator 940 so that the amount of dispersion compensation becomes the proper amount of dispersion compensation when the standby system first optical fiber 34*a* is being put into operation. This allows for the reduction in time for redundancy switching of an optical transmission line from a standby system optical transmission line to an active system optical transmission line.

Described above is an explanation based on the embodiments of the present invention. These embodiments are intended to be illustrative only and it will be obvious to those skilled in the art that various modifications to constituting elements and processes could be developed and that such modifications are also within the scope of the present invention.

For example, an ultrahigh-speed optical transmission system of at least a 40 Gbps-transmission speed is described in the above-described embodiment. However, the transmission speed is not specifically limited, and the transmission speed may be, for example, 10 Gbps. QPSK is also employed as the digital modulation method of an optical transmission system in the above-described embodiment. However, the modulation method is not specifically limited.

What is claimed is:

1. An optical transmission system comprising:
   an optical transmission apparatus operative to transmit an optical main signal;
   an optical reception apparatus operative to receive the optical main signal;
   an optical transmission line that is placed between the optical transmission apparatus and the optical reception apparatus and is redundantly configured with an active system optical transmission line and a standby system optical transmission line;
   an optical switch operative to switch an optical transmission line between the active system optical transmission line and the standby system optical transmission line;

a variable dispersion compensator placed between the optical switch and the optical reception apparatus;
a dispersion amount measuring unit operative to measure the dispersion amount of the standby system optical transmission line when the active system optical transmission line is being selected by the optical switch;
a dispersion compensation amount setting unit operative to set the amount of dispersion compensation to be applied to the standby system optical transmission line based on the measured dispersion amount of the standby system optical transmission line; and
a control unit operative, when the optical transmission line is switched from the active system optical transmission line to the standby system optical transmission line by the optical switch, to control the variable dispersion compensator so that the amount of dispersion compensation becomes the set amount of dispersion compensation;
wherein the dispersion amount measuring unit includes:
a supervisory control signal control unit operative to generate a supervisory control signal having a wavelength different from that of the optical main signal and to shuttle the supervisory control signal between the optical transmission apparatus and the optical reception apparatus;
a round-trip time measuring unit operative to measure the time required for the supervisory control signal to travel back and forth between the optical transmission apparatus and the optical reception apparatus; and
a dispersion amount calculation unit operative to calculate the distance of the standby system optical transmission line based on the measured round-trip time and then to calculate the dispersion amount of the standby system optical transmission line based on the distance and on a dispersion coefficient of the standby system optical transmission line that is set in advance.

2. The optical transmission system according to claim 1, wherein the control unit controls the variable dispersion compensator in a variable manner based on the bit error rate or the number of error corrections measured by the optical reception apparatus after controlling the variable dispersion compensator so that the amount of dispersion compensation becomes the set amount of dispersion compensation.

3. An optical transmission system comprising:
an optical transmission apparatus operative to transmit an optical main signal;
an optical reception apparatus operative to receive the optical main signal;
an optical transmission line that is placed between the optical transmission apparatus and the optical reception apparatus and is redundantly configured with an active system optical transmission line and a standby system optical transmission line;
an optical switch operative to switch an optical transmission line between the active system optical transmission line and the standby system optical transmission line;
a variable dispersion compensator placed between the optical switch and the optical reception apparatus;
a dispersion amount measuring unit operative to measure the dispersion amount of the standby system optical transmission line when the active system optical transmission line is being selected by the optical switch;
a dispersion compensation amount setting unit operative to set the amount of dispersion compensation to be applied to the standby system optical transmission line based on the measured dispersion amount of the standby system optical transmission line; and
a control unit operative, when the optical transmission line is switched from the active system optical transmission line to the standby system optical transmission line by the optical switch, to control the variable dispersion compensator so that the amount of dispersion compensation becomes the set amount of dispersion compensation,
wherein the dispersion amount measuring unit includes:
a low-frequency superimposition unit operative to superimpose a supervisory control signal for the distance measurement of a frequency lower than that of the optical main signal on the optical main signal and to shuttle the superimposed signal between the optical transmission apparatus and the optical reception apparatus;
a round-trip time measuring unit operative to measure the time required for the supervisory control signal for the distance measurement to travel back and forth between the optical transmission apparatus and the optical reception apparatus; and
a dispersion amount calculation unit operative to calculate the distance of the standby system optical transmission line based on the measured round-trip time and then to calculate the dispersion amount of the standby system optical transmission line based on the distance and on a dispersion coefficient of the standby system optical transmission line that is set in advance.

4. The optical transmission system according to claim 3, wherein the control unit controls the variable dispersion compensator in a variable manner based on the bit error rate or the number of error corrections measured by the optical reception apparatus after controlling the variable dispersion compensator so that the amount of dispersion compensation becomes the set amount of dispersion compensation.

5. An optical transmission system comprising:
an optical transmission apparatus operative to transmit an optical main signal;
an optical reception apparatus operative to receive the optical main signal;
an optical transmission line that is placed between the optical transmission apparatus and the optical reception apparatus and is redundantly configured with an active system optical transmission line and a standby system optical transmission line;
variable dispersion compensators placed on the active system optical transmission line and the standby system optical transmission line, respectively;
an optical switch, which is placed between the variable dispersion compensators and the optical reception apparatus, operative to switch an optical transmission line between the active system optical transmission line and the standby system optical transmission line;
a dispersion amount measuring unit operative to measure the dispersion amount of the standby system optical transmission line when the active system optical transmission line is being selected by the optical switch;
a dispersion compensation amount setting unit operative to set the amount of dispersion compensation to be applied to the standby system optical transmission line based on the measured dispersion amount of the standby system optical transmission line; and
a control unit operative to control one of said variable dispersion compensators that is placed on the standby system optical transmission line so that the amount of dispersion compensation becomes the set amount of dispersion compensation,
wherein the dispersion amount measuring unit includes:

a supervisory control signal control unit operative to generate a supervisory control signal having a wavelength different from that of the optical main signal on the optical main signal and to shuttle the supervisory control signal between the optical transmission apparatus and the optical reception apparatus;

a round-trip time measuring unit operative to measure the time required for the supervisory control signal for the distance measurement to travel back and forth between the optical transmission apparatus and the optical reception apparatus; and a dispersion amount calculation unit operative to calculate the distance of the standby system optical transmission line based on the measured round-trip time and then to calculate the dispersion amount of the standby system optical transmission line based on the distance and on a dispersion coefficient of the standby system optical transmission line that is set in advance.

6. The optical transmission system according to claim 5, wherein the control unit controls the variable dispersion compensator in a variable manner based on the bit error rate or the number of error corrections measured by the optical reception apparatus after switching the optical transmission line from the active system optical transmission line to the standby system optical transmission line by the optical switch.

7. An optical transmission system comprising:

an optical transmission apparatus operative to transmit an optical main signal;

an optical reception apparatus operative to receive the optical main signal;

an optical transmission line that is placed between the optical transmission apparatus and the optical reception apparatus and is redundantly configured with an active system optical transmission line and a standby system optical transmission line;

variable dispersion compensators placed on the active system optical transmission line and the standby system optical transmission line, respectively;

an optical switch, which is placed between the variable dispersion compensators and the optical reception apparatus, operative to switch an optical transmission line between the active system optical transmission line and the standby system optical transmission line;

a dispersion amount measuring unit operative to measure the dispersion amount of the standby system optical transmission line when the active system optical transmission line is being selected by the optical switch;

a dispersion compensation amount setting unit operative to set the amount of dispersion compensation to be applied to the standby system optical transmission line based on the measured dispersion amount of the standby system optical transmission line; and a control unit operative to control one of said variable dispersion compensator that is placed on the standby system optical transmission line so that the amount of dispersion compensation becomes the set amount of dispersion compensation, wherein the dispersion amount measuring unit includes:

a low-frequency superimposition unit operative to superimpose a supervisory control signal for the distance measurement of a frequency lower than that of the optical main signal on the optical main signal and to shuttle the superimposed signal between the optical transmission apparatus and the optical reception apparatus;

a round-trip time measuring unit operative to measure the time required for the supervisory control signal for the distance measurement to travel back and forth between the optical transmission apparatus and the optical reception apparatus; and a dispersion amount calculation unit operative to calculate the distance of the standby system optical transmission line based on the measured round-trip time and then to calculate the dispersion amount of the standby system optical transmission line based on the distance and on a dispersion coefficient of the standby system optical transmission line that is set in advance.

8. The optical transmission system according to claim 7, wherein the control unit controls the variable dispersion compensator in a variable manner based on the bit error rate or the number of error corrections measured by the optical reception apparatus after switching the optical transmission line from the active system optical transmission line to the standby system optical transmission line by the optical switch.

* * * * *